United States Patent
El Zur

(10) Patent No.: US 10,003,886 B2
(45) Date of Patent: Jun. 19, 2018

(54) SYSTEMS AND METHODS FOR ADAPTIVE NOISE MANAGEMENT

(71) Applicant: Uri El Zur, Irvine, CA (US)

(72) Inventor: Uri El Zur, Irvine, CA (US)

(*) Notice: Subject to any disclaimer, the term of this patent is extended or adjusted under 35 U.S.C. 154(b) by 229 days.

(21) Appl. No.: 14/753,925

(22) Filed: Jun. 29, 2015

(65) Prior Publication Data

US 2015/0378325 A1 Dec. 31, 2015

Related U.S. Application Data

(60) Provisional application No. 62/019,389, filed on Jun. 30, 2014.

(51) Int. Cl.
| | |
|---|---|
| *G10K 11/16* | (2006.01) |
| *H04R 3/02* | (2006.01) |
| *G05B 13/02* | (2006.01) |
| *H04R 29/00* | (2006.01) |
| *E05F 15/70* | (2015.01) |
| *E06B 9/68* | (2006.01) |

(52) U.S. Cl.
CPC ............... *H04R 3/02* (2013.01); *E05F 15/70* (2015.01); *G05B 13/0205* (2013.01); *H04R 29/004* (2013.01); *E05Y 2900/146* (2013.01); *E06B 2009/6809* (2013.01); *E06B 2009/6818* (2013.01)

(58) Field of Classification Search
CPC ......... H04R 3/02; H04R 29/004; E05F 15/70; E05Y 2900/146; E06B 2009/6809; E06B 2009/6818

See application file for complete search history.

(56) References Cited

U.S. PATENT DOCUMENTS

| 5,737,433 A | 4/1998 | Gardner | |
|---|---|---|---|
| 2006/0293892 A1* | 12/2006 | Pathuel | G10L 17/00 |
| | | | 704/246 |
| 2007/0223714 A1* | 9/2007 | Nishikawa | G10K 11/1788 |
| | | | 381/71.1 |
| 2011/0157357 A1 | 6/2011 | Weisensale | |
| 2011/0221573 A1 | 9/2011 | Huat | |
| 2012/0210741 A1* | 8/2012 | Fujiwara | F24F 1/06 |
| | | | 62/126 |
| 2013/0272527 A1* | 10/2013 | Oomen | G10K 15/12 |
| | | | 381/17 |

OTHER PUBLICATIONS

International Search Report and Written Opinion for PCT/US15/38576, dated Sep. 30, 2015 (7 pages).

* cited by examiner

*Primary Examiner* — Andrew L Sniezek
(74) *Attorney, Agent, or Firm* — McAndrews, Held & Malloy, Ltd.

(57) ABSTRACT

Methods and systems provide adaptive noise management in a space. The adaptive noise management comprises performing at least the steps of detecting when noise is present in the space, analyzing the detected noise, and taking one or more actions in response to the detected noise, based on the analysis of the detected noise. The one or more actions may comprise applying noise cancellation to mitigate, reduce, or eliminate effects of the detected noise, adjusting at one or more openings in the space, or a combination thereof.

18 Claims, 6 Drawing Sheets

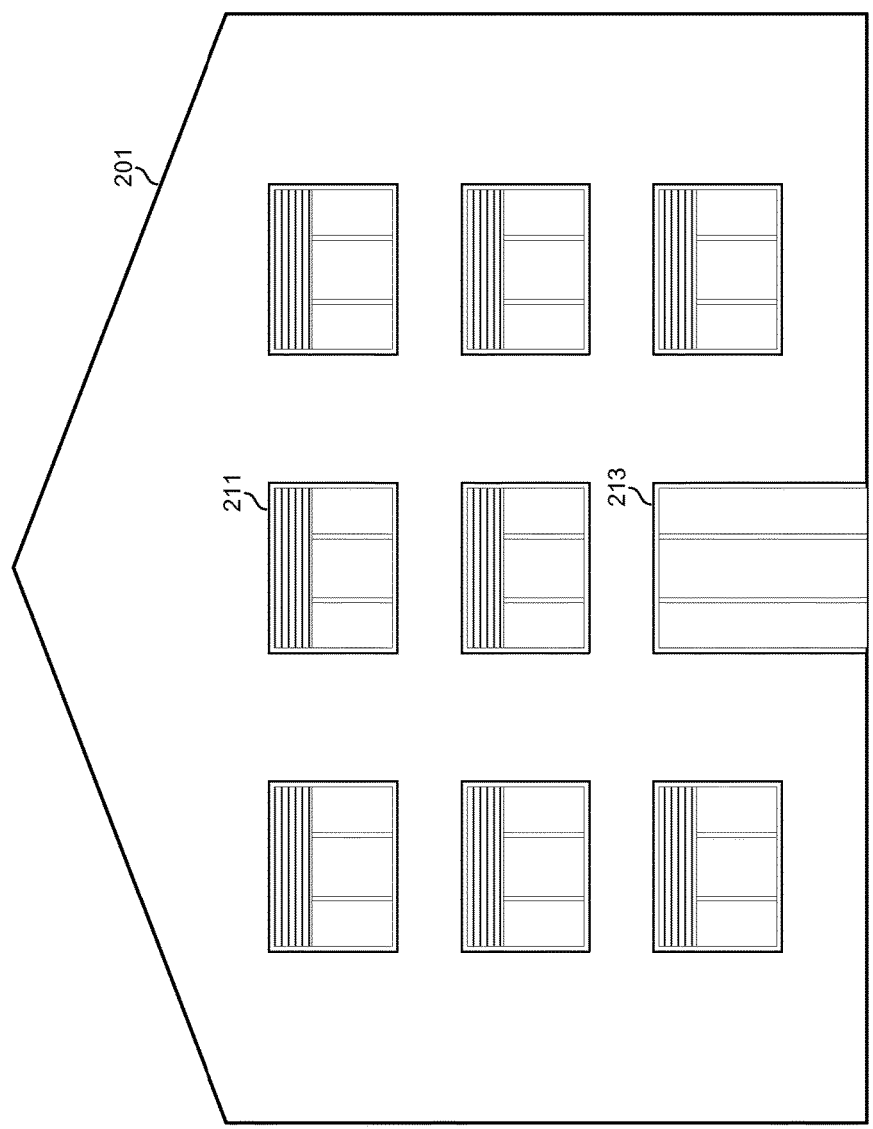

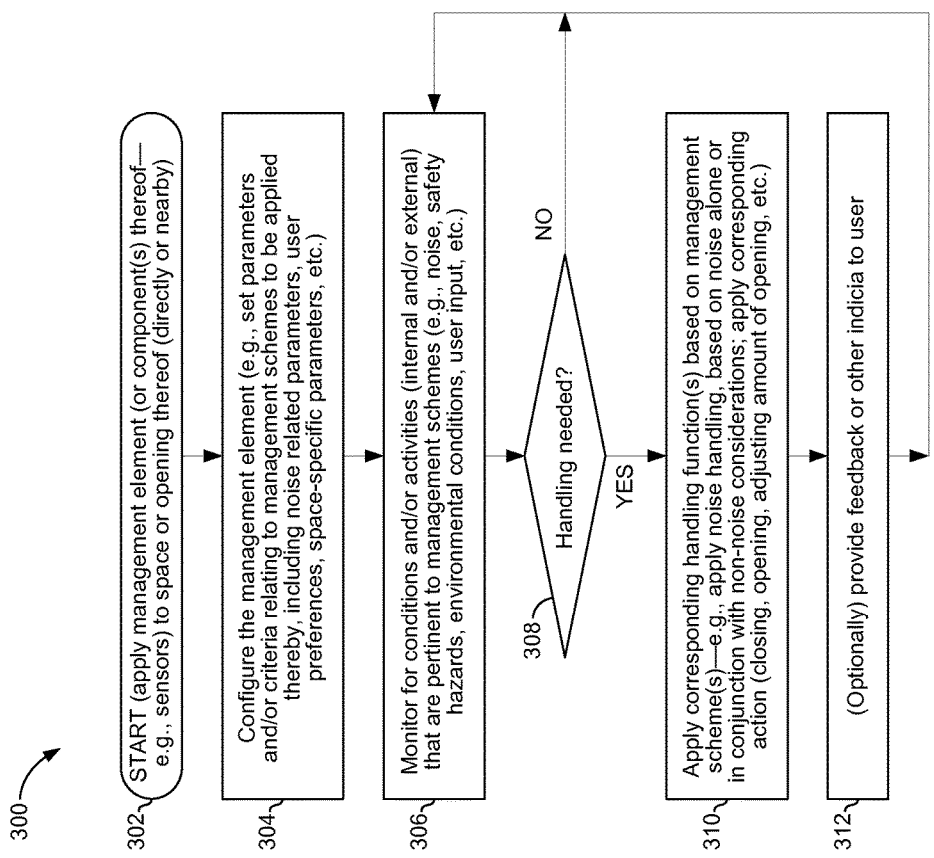

SYSTEMS AND METHODS FOR ADAPTIVE NOISE MANAGEMENT

CLAIM OF PRIORITY

This patent application makes reference to, claims priority to and claims benefit from the U.S. Provisional Patent Application Ser. No. 62/019,389, filed Jun. 30, 2014. The above identified application is hereby incorporated herein by reference in its entirety.

CROSS-REFERENCE TO RELATED APPLICATIONS/INCORPORATION BY REFERENCE

This patent application also makes reference to:
U.S. patent application Ser. No. 14/753,819, filed on Jun. 29, 2015; and
U.S. patent application Ser. No. 14/753,884, filed on Jun. 29, 2015.
Each of the above identified applications is hereby incorporated herein by reference in its entirety.

TECHNICAL FIELD

Aspects of the present disclosure relate management of spaces and/or opening thereof. Specifically, certain implementations of the present disclosure relate to systems and methods for adaptive noise management.

BACKGROUND

Existing methods and systems, if any exist, for management of noise in particular locations can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

Systems and/or methods are provided for adaptive noise management of spaces and/or openings thereof, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

BRIEF DESCRIPTION OF SEVERAL VIEWS OF THE DRAWINGS

FIG. 2A illustrates an example premises which may be configured to use adaptive spaces and/or opening management.

FIG. 3 is a flow chart that illustrates an example process for applying adaptive management to spaces and/or openings thereof.

DETAILED DESCRIPTION

Certain implementations in accordance with the disclosure may be found in methods and systems for using adaptive noise management. As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the terms "block" and "module" refer to functions than can be performed by one or more circuits. As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
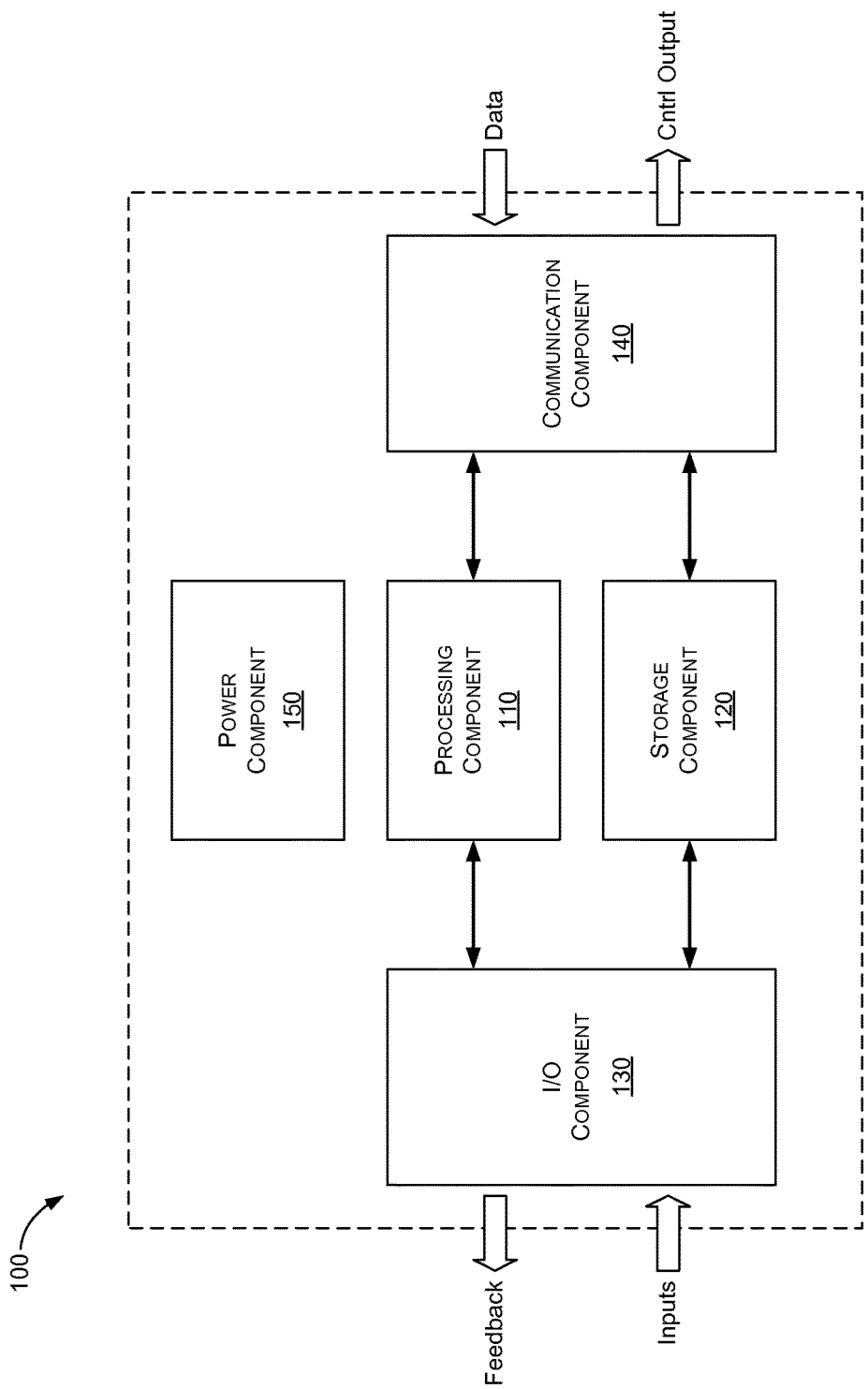
FIG. 1 illustrates an example electronic system which may be configured to implement and/or provide adaptive management schemes.

FIG. 1 illustrates an example electronic system which may be configured to implement and/or provide adaptive management schemes. Shown in FIG. 1 is a system 100.

The system 100 may comprise suitable circuitry (as well as other necessary components or resources) for implementing various aspects of the present disclosure. In this regard, the system 100 may be configured to implement and/or run adaptive and intelligent management schemes, such as those involving spaces and/or openings thereof, as described in more detail below.

In the example implementation depicted in FIG. 1, the system 100 may comprise a processing component 110, storage component 120, input/output (I/O) component 130, a communication component 140, and a power component 150.

The processing component 110 may comprise suitable circuitry for performing processing operations in the system 100. In this regard, the processing component may be operable to, for example, process data; run or execute various functions, tasks, and/or applications; and/or configure, control, and/or manage operations of the system 100 (and/or other components in the system 100). For example, the processing component 110 may also be configured to run and/or execute functions, tasks, and/or applications for providing or supporting particular services, such as adaptive management schemes. Further, the processing component 110 may also configure, control, and/or manage various components and/or subsystems (or operations thereof) in the system 100, such as by generating and issuing control signals. This may be done, for example, when supporting particular services, such as adaptive management schemes.

The processing operations of the processing component 110 may be performed based on programs, code, and/or data. The programs, code, and/or data may be stored, for example, in the storage component 120. In some instances, programs, code, and/or data may be replaced and/or updated (e.g., by an authorized local or remote operator), such as to correct issues (e.g., bugs) and/or to enable new functionality. Further, in some instances, program and/or code may be structured or reconfigured to run in cooperation with other local or remote devices.

The processing component 110 may comprise a general purpose processing component, which may be configured to perform or support particular types of operations. Alternatively, the processing component 110 may comprise a special purpose processor—e.g., an application processor (e.g., ASIC).

The storage component 120 may comprise suitable circuitry for providing permanent and/or non-permanent storage, buffering, and/or fetching of data, which may be used, consumed, and/or processed in the system 100. In this regard, the storage component 120 may comprise different memory technologies, including, for example, read-only memory (ROM), random access memory (RAM), Flash memory, solid-state drive (SSD), and/or field-programmable gate array (FPGA). The storage component 120 may store, for example, configuration data, which may comprise parameters and/or code, comprising software and/or firmware; functions or system settings; libraries; etc.

The I/O component 130 may comprise suitable circuitry for supporting input and/or output interactions with users of the system 100. For example, the I/O component 130 may comprise suitable circuitry for supporting visual, audio, and/or textual interactions with users, using devices incorporated directly (e.g., display, speakers, etc.) and/or coupled to the system 100. Thus, the I/O component 130 may enable receiving user input (e.g., specifying criteria and/or parameters for handling or treating noise and/or other audio inputs), and/or provide suitable notification (e.g., safety alerts and/or commands). In some instances, the I/O component 130 may also incorporate interfacing functionality (as well any required components—e.g., hardware and/or software), to enable interfacing with suitable mechanical and/or electrical devices that may be used in conjunction with the operations supported by the system 100. For example, I/O component 130 may be operable to facilitate and/or enable interfacing with mechanical elements operating device that may be used to provide opening management.

The communication component 140 may comprise suitable circuitry for supporting communication of data to and/or from the system 100. For example, the communication component 140 may comprise processing circuitry for processing (including generating, when necessary) signals transmitted and/or received by the system 100, in accordance with wired and/or wireless interfaces, standards, and/or protocols supported by the system 100; a wireless front-end comprising circuitry for performing wireless communications, such as over one or more supported wireless interfaces; and/or a wired front-end comprising suitable circuitry for performing wired based communications, such as over one or more supported physical wired interfaces.

The power component 150 may comprise suitable circuitry for managing power in the system 100. For example, the power component 150 may be configured to handle obtaining power (e.g., connection to typical power sources, generating power, such as solar power or sound/vibration based power, etc.), provide power to other components in the system 100, and/or manage power supply/consumption in the system 100 (e.g., in accordance with a preconfigured scheme or preconfigured criteria). In some instances, the power component 150 may be adapted to send alerts, such as when particular criteria and/or conditions are met—e.g., when power supply is being cut off, when power supply reaches a certain low water mark, etc.

Other components (not shown) may also be incorporated into the system 100, when deemed necessary. For example, in some instances, the system 100 may comprise hardware and/or software for supporting various audio related functions and/or operations (e.g., recording, adaptive audio filtering, adaptive audio generation, etc.). Also, in some instances, the system 100 may incorporate (or be configure to use, if implemented as external elements) one or more sensors that may be used in obtaining sensory data, relating to, for example, pertinent conditions that may be relevant to operations of the system 100—e.g., pertinent to the adaptive management schemes implemented thereby.

While the system 100 as described herein may be imply a singular system, the disclosure is not so limited, and in some implementations, the system 100 may be implemented in distributed manner—e.g., the system 100 (or various components and/or functions thereof) may be distributed over multiple devices, and/or may be configured to interact with and/or utilize other resources (e.g., for providing various functions, such as computation and analysis functions). Example of such multiple devices and/or other resources comprise local and/or remote computers (including home computer), handheld devices (e.g., cell/smartphones, tablets, etc.), and cloud computing based resources ("the cloud"), and the like. Further, it should be understood that the system 100 represents only a non-limiting example implementation. Various other example implementations (e.g., of systems and/or devices) may be utilized in implementing system 100 in accordance with the present disclosure, and/or in performing functions or operations associated therewith (e.g., with respect to the management of openings), some of which are described in more detail in incorporated U.S. patent application Ser. No. 14/753,819.

In operation, the system 100 may be used to implement, support, and/or run adaptive and intelligent management of spaces and/or openings thereof. For example, the "spaces" may comprise sub-sections of premises. The premises may be residential premises (e.g., houses, multi-dwelling units, temporary housing, tents, etc.), commercial premises (e.g., multi-office building, hotels, hospitals, labs, etc.), industrial premises, and the like; and the sub-sections of such premises may comprise, for example, individual rooms, offices, etc. Accordingly, the "openings" may comprise areas in the encompassing surfaces (e.g., walls, ceilings, and floors) of a space which may allow for reduced (or eliminated) separation between the interior of the space and its surroundings (including, e.g., other sub-sections in the same premises, other/attached premises, external/surrounding areas, etc.). Examples of openings comprise, for example, windows, doors, vents, etc. An example premises and implementation of adaptive management schemes therein in accordance with the present disclosure are described in more detail with respect to, for example, FIGS. 2A and 2B. Nonetheless, while the disclosure generally describes environments with respect to spaces and/or openings in a premises (or sub-sections thereof), the disclosure need not be so limited, and other environments are also possible (e.g., motor vehicles, aircraft, trains, restaurants, etc.).

The management of spaces and/or openings may comprise, for example, use or application of adaptive schemes for management of noise (e.g., ambient or local noise effecting spaces associated with such openings, and/or occupants of such spaces), and/or management of actions associated with such openings (e.g., closing or opening, etc.). In this regard, for the present disclosure, noise has the meaning of any undesired audio that is audible to humans or equipment—e.g., any disturbance of the air waves that is deemed undesirable, such as based on particular criteria or factors, as described in more detail below. Further, in some implementations such adaptive management schemes may be configured based on environmental conditions (e.g., temperature, humidity, precipitation, wind, pollution, etc.), energy (e.g., power consumption by appliances used in the spaces) and/or other considerations (e.g., safety, etc.).

In an example implementation, the system 100 may be configured to implement an adaptive noise management scheme. In this regard, the adaptive noise management scheme may be configured and/or adjusted to handle noise, alone and/or in conjunction with other considerations (e.g., safety, light, environmental conditions, air pollution level, etc.). Further, such adaptive noise management scheme may be configured particularly for specific spaces, based on conditions unique thereto, and/or based on specific subjective preferences of particular occupants of these spaces. Accordingly, spaces (and/or parts thereof) may be managed adaptively based on a plurality of considerations, including noise and other non-noise related conditions.

For example, many spaces (e.g., hotel rooms) may suffer from noise, which may originate from sources external to the spaces (e.g., people, machines, traffic, etc.) and/or sources within the spaces themselves (e.g., appliances in the spaces). In this regard, noise, particularly noise originating from external sources, may penetrate through openings (e.g., windows, doors, etc.) or even through non-openings (e.g., walls, ceilings, floors, etc., especially where there may be insufficient or improper noise insulation). Thus, to enhance enjoyment and/or use of such space, noise may be managed in adaptive and/or intelligent manner. In this regard, adaptive and/or intelligent noise management may comprise determining noise sources that are particular to specific spaces; determining noise related characteristics of the spaces (e.g., characteristics and/or parameters relating to noise propagation into the spaces through openings and non-openings, noise sources within the spaces, etc.); and determining and/or applying suitable passive and/or active measures to mitigate, eliminate, and/or reduce undesired noise.

Further, the handling of the noise (e.g., determining what constitutes noise, when something becomes noise, and how best to mitigate, eliminate, and/or reduce that noise) may be particularly configured in accordance with pre-set (and/or dynamically set/adjusted) handling preferences, which may be made unique and/or specific for each occupant in the space. For example, preconfigured data (e.g., libraries) and/or user set parameters may be used to specify for a particular space (and/or for a particular user) what may be treated as noise/noise sources or pollutants (or criteria for identifying such noise sources/pollutants), and/or to specify corresponding handling measures to be undertaken and/or applied for each such noise source/pollutant. Example handling measures may comprise actions aimed at compensating for, offsetting, and/or cancelling the corresponding noise.

Providing such adaptive and/or intelligent management of spaces may be desirable and beneficial for existing and new spaces. For example, use of such adaptive and/or intelligent management in existing buildings/infrastructure may allow eliminating and/or minimizing noise, which may result in improved values and/or utilization of properties close to noise sources. Also, enhanced conditions resulting from better and more intelligent management of noise in spaces (and/or conditions associated with these spaces) may result in increased spectrum of activities available in corresponding spaces, and/or improved quality of life for affected inhabitants. Further, with all types of spaces (e.g., both old/existing and new), use of these solutions may result in less cost and/or energy use.

In some instances, systems implementing adaptive management schemes, such as the system 100, may be configured to provide overall adaptive management of openings, which may (or may not) incorporate adaptive management of noise. Adaptive management of openings and example uses thereof are described in more detail in incorporated U.S. patent application Ser. No. 14/753,884.

FIG. 2A illustrates an example premises which may be configured to use adaptive spaces and/or opening management. Shown in FIG. 2A is premises 201.

The premises 201 may comprise residential premises (e.g., houses, multi-dwelling units, etc.), commercial premises (e.g., multi-office building, hotels, hospitals, etc.), industrial premises, or the like. The premises 201 may comprise one or more openings which may expose an interior of the premises 201 or particular spaces within the premises 201 (e.g., rooms, offices, etc.) to certain conditions and/or activities that may affect use and/or enjoyment of the premises or the spaces. The openings may comprise, for example, windows 211 and/or doors 213. Examples of such conditions and/or activities may comprise noise causing conditions and/or activities, ambient environmental conditions (e.g., climate conditions, such as rain, heat, wind, etc.), traffic, conditions and/or activities creating safety or security hazards, etc.

Accordingly, such openings may be managed, using adaptive and/or intelligent management schemes, to mitigate and/or eliminate effects of such undesired conditions and/or activities. For example, one or more instances of the system 100 may be used to implement adaptive noise management in the premises 201 (and/or in individual spaces therein), substantially as described with respect to FIG. 1. Further, in some instances actions applicable to the openings (e.g., closing or opening them, and/or the amount of opening that is applied) may be adaptively managed based on relevant conditions and/or activities.

For example, openings in premises may be selectively opened or closed, such as based on conditions (or effects thereof) to which the corresponding internal space(s) may be exposed. In this regard, noise may be a particularly pertinent consideration. Many internal spaces (e.g., hotel rooms) may suffer, for example, from noise, such as when these spaces (or openings thereof) are located near significant external noise sources (e.g., highways, railways or railway stations, etc.); where there may be nearby internal noise sources (e.g., elevators, ice makers, air conditioning (A/C) unit in the space or in a neighboring space, TV or other audio devices in a neighboring space, noisy occupants in neighboring spaces, etc.). Noise may be particularly of concern where there may be insufficient or improper noise insulation—e.g., where there may be a nearby outside door connecting to a neighboring space that is not insulated, insulation of plumbing that may be improper or insufficient; insulation in windows and/or external walls, floors, and/or ceilings to external sources of noise which may be improper or insufficient; or insulation in walls, ceiling, and/or floors against noise from spaces that are adjust, above, or below which may be improper or insufficient. Similar noise issues may arise with other types of premises (e.g., offices may be located next to a railway station, for example; private houses or apartments may be exposed to various sources of noise, such as street, highway, the neighbors, etc.).

In some instance, other considerations (beside noise) may be considered when determining actions that are taken with respect to an opening (e.g., whether to open or close the opening). While actions may be taken to remedy noise (e.g., by closing windows, in instances where the noise is introduced mainly through the windows rather than through the walls, and assuming closing the window does reduce the noise sufficiently as desired by the user of the premises), in some instances it may be desirable to weigh noise related concerns against various, non-noise related considerations that may be affected by the actions taken to remedy noise (e.g., wanting or need the keep windows opened, at least to a certain degree).

For example, in some instances it may be desired to keep openings (e.g., windows) ajar to allow fresh air to flow into the corresponding internal spaces, rather than run air conditioning (A/C) systems that provide conditioned air. Typically, when A/C systems are used, the conditioned air is forced into the internal space, with no external air being allowed. Running such A/C systems, however, require energy use, and as such the decision to use such systems typically may be based on noise and energy consideration. Further, in some instances the A/C systems may be source of noise. Other considerations may also need to (or should) be taken into account. For example, in some instances A/C systems may use filters, which may not have been cleaned for long time, increasing health risks and promoting bacterial growth. Further, odors and stale air may be common in many instances where such systems are used, particularly continuously or for extended periods of time. Benefiting from naturally available better quality air (e.g., temperature wise, quality wise etc.) may require operating an opening when humans are not present or prefer to retire for a night sleep. The alternative—that is use of the opening (e.g., opening the window), however, may result in exposure of occupants to undesired conditions—e.g., noise, which may disturb occupants, rising or falling temperatures (which may also cause a disturbance or discomfort to an occupant—e.g., waking up), presence of pollutants in the air, etc.

Another consideration that may be pertinent to the determination of actions taken with respect to an opening is safety. For example, when determining whether to open or close the opening, occupants (e.g., dwellers or guests) may have certain safety considerations with respect to particular openings—e.g., an opening may allow intruders to gain access to the internal space. Such safety considerations may be used (along or in conjunction with other considerations) as basis for an adaptive management scheme applied to the particular openings. For example, safety considerations may be used alone or in conjunction with such other consideration as noise (and change in noise over time or based on normal human activity hours), light, temperature changes, precipitation and/or change in humidity levels. Very common and desirable in many areas is to leave windows open—e.g., in summer nights, as the night breeze may cool down the internal space. Thus, while it may ultimately be desirable to leave openings open, the occupants may be forced to close them when such considerations override the perceived benefits of keeping the openings open.

Accordingly, in various example implementations, adaptive solutions may be used to intelligently manage such openings, based on various pertinent considerations (e.g., noise, safety, light, temperature changes, precipitation and/or change in humidity levels, air pollution level, etc.) that are particular to the corresponding spaces and/or subjective preferences of particular occupants of these spaces.

Providing such adaptive and/or intelligent management of openings may be desirable and beneficial for existing and new premises. In this regard, use of such adaptive and/or intelligent management in existing buildings/infrastructure may allow eliminating and/or minimizing noise, which may result in improved values and/or utilization of properties close to noise sources. This may be particularly beneficial in commercial premises.

For example, hotels may be able to charge more for rooms that otherwise may be less desirable (e.g., due to noise). Further, enhanced conditions resulting from better and more intelligent management of noise and/or of operating openings (and/or conditions associated with their use) may result in increased spectrum of activities available in corresponding spaces, and/or improved quality of life for affected inhabitants. As noise may penetrate through thinner walls, like those found in openings, installing noise management devices there or nearby to the openings may be advantageous. Thus, retrofitting openings (e.g., windows) of existing properties may result in improved property values, increased economic benefits (e.g., price increases), and/or enhanced used conditions (e.g., properly refreshed guests, after a better night sleep). With new buildings and/or infrastructure, use of such solutions may translate to improved economic benefits (e.g., lower insulation and ventilation or cooling and heating costs). Further, with all types of properties (e.g., both old and new), use of these solutions may result in less cost and/or energy use (e.g., due to lower A/C utilization, which may be further enhanced, such as by use of sensors to control the A/C systems based on the opening and closing of the windows).

While various implementations are described with respect to openings, it should be understood that the disclosure is not so limited. In this regard, while internal spaces may be particularly susceptible to external conditions and/or activities (thus to noise sources, safety hazards, etc.) through openings, other parts (non-openings) of spaces may also expose internal spaces to external conditions and/or activities. For example, noise may propagate and/or penetrated into internal spaces through walls (particular poorly insulated ones) and as such internal space may be exposed to external noise sources even where no opening are present. Accordingly, similar measures may be used to handle exposure to external (or internal) noise pollutants and/or other condition sources through non-openings in substantially similar manner as described with respect to openings based exposure.

Figure 2B:
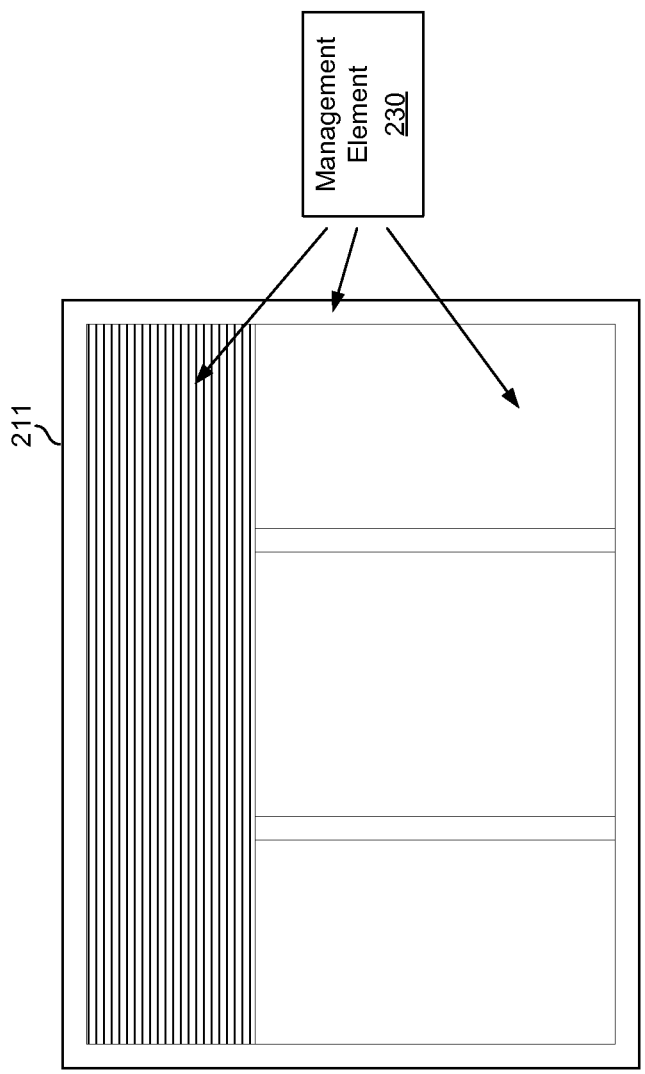
FIG. 2B illustrates an example incorporation of a management device into an opening (e.g., window) to provide adaptive opening management.

FIG. 2B illustrates an example incorporation of a management device into an opening (e.g., window) to provide adaptive opening management. Shown in FIG. 2B is an opening (e.g., window) 211 and a management element 230.

The management element 230 may comprise suitable circuitry for implementing various aspects of the disclosure. In particular, the management element 230 may be configured to implement, apply, and/or support use of adaptive and/or intelligent management schemes, such as to openings (e.g., the window 211). In this regard, management element 230 may be incorporated into or attached to the opening 211 itself (or part(s) thereof—such as, where the opening 211 is a window, one or more of the window frames, the window shutter, and the window glass), and/or may be placed near the opening 211. The management element 230 may comprise and/or may correspond to at least a portion of the system 100 described in FIG. 1.

The adaptive and/or intelligent management implemented, applied, and/or supported by the management element 230 may be configured, for example, based on a plurality of considerations (e.g., noise, safety, light, temperature changes, precipitation, humidity, air pollutants etc.) relating to conditions that may affect spaces associated with the openings, and/or based on subjective preferences of particular users (e.g., occupants of these spaces).

For example, the management element 230 may be used to provide optimized management of openings based on noise. In this regard, while active noise cancellation techniques may be available, in many cases such techniques may provide or be adapted for only partial solutions (e.g., similar to headsets), and/or may be usable in rigid manner—e.g., targeted to cancellation of any and all noise, without allowing for particular treatment, such as, for example, based on noise identification, such as by configuration, by the user, and/or by a computerized algorithm. In other words, such techniques may not configurable for identification and handling of specific noise sources. Further, existing techniques are configured to attempt to silence noise rather than "treating" noise and/or addressing or specific audible sources. Further, existing solutions are not integrated with other equipment, and/or do not target "after-market" or specific uses.

The adaptive noise scheme provided in accordance with the present disclosure, however, may be configured to address noise at the receiving end. In this regard, particular premises may have regular noise patterns, such as traffic related noise patterns (e.g., day or middle of the night; typical truck noise; horns, etc.); railway related noise (e.g., passing train on other railway noise); airport or air traffic related noise; industrial noise; and/or typical common noise (e.g., neighbor's dog). The noise management solutions, in accordance with various implementations of the present disclosure, may be configured to function as noise silencer, tailored to silence specific noise sources and/or to do so according to particular criteria and/or conditions.

For example, by incorporating or attaching the management element 230 to an opening (e.g., window 211), or placing it near or around the opening (e.g., where most of the audio energy may penetrate from the outside), ambient noise may be detected, and handling noise may comprise performing noise silencing, which may be configured adaptively based on the particular noise, specific to the opening and surrounding sources.

In an example implementation, the noise management scheme (e.g., as performed by the management element 230) may comprise a noise detection stage, which may be performed automatically and/or based on user configuration or input (e.g., command). The detection stage may comprise identifying sources generating audio matching a particular pattern, and/or determining that the audio creates or constitute noise. For example, the audio may be determined to constitute noise if it is above particular, pre-configured level(s), set in dBs for example, which may correspond to highest acceptable level (e.g., as configured by the user) or type of noise (e.g., user hates drums or a particular type of music or a particular band). The patterns used in the matching and/or the levels determining when audio create noise may be initially pre-set (as default values), and may be adjusted and/or modified thereafter (e.g., based on user input, corresponding to users' specific, subjective preferences).

Once detected, the noise may be handled, such as by using real time cancellation within a time interval that makes the impact limited on the human ear, and/or by recording the noise and analyzing pattern(s) therein (e.g., to enable configuring silencer functions). In some instances, the noise handling may comprise a "listening" phase. Such listening phase may comprise listening to noise coming in, and identify a "configured noise source" or a disturbing noise pattern. For example, noise identification may be based on use of leading edge or comparison to audio signature or frequency domain analysis. Alternatively, in some instances noise related data (e.g., recordings of noise) may be sent to an external device, either in the premises or outside of it (e.g., a cloud based computing service) for further analysis, which may optionally be followed by directive to take some action (with, in the meantime, a local decision being made and/or taken, in some instances) and/or by sending instructions (adapted to the local device or generic) as to how to neutralize the noise source (e.g., what algorithm to use, setting to some parameters and/or computer code to run locally to perform such an algorithm).

Noise cancellation may then be performed. In this regard, noise cancellation may comprise use of a noise equalizer, which may generate a silencing audio—e.g., comprising signals having opposite amplitude in same audio frequencies (where most of the energy resides). For example, noise cancellation may comprise actively creating "opposite" noise at the edge of the domain/space being protected and/or treated, and broadcasting that opposite noise outwards. In that manner, the noise energy that penetrates the protected domain though an opening or through the walls is reduced, thus making the noise cancellation, inside the "protected space," easier. Further, during silencing operations, energy applied to cancel the noise may be directed to the outside, sideways on the openings, and/or internally into the spaces.

The noise management may be adaptively configured for each opening, associated space, and/or authorized user. In this regard, the noise handling may deviate, being derived in each space based on, e.g., particular acoustic configuration and/or acoustic characteristics (e.g., dampening) associated with that space. In this regard, each space (e.g., hotel room) may dampen noise differently and as such may have a particular "acoustic personality," which may be used in identifying the noise sources as it may affect how noise and/or noise sources received/perceived. Thus, noise source identification and/or in the noise handling associated with that space may be adaptively configured to better match the local acoustic personality. Also, noise source(s) may be closer or further away, or at a given angle or with a specific set of obstacles between the source and the specific premise, and the noise cancelation may be adjusted to actual noise strength. Thus, the noise management scheme may comprise an acoustic personality detection stage in which noise-related characteristics for particular space may be determined.

Further, some sources may be moving (e.g., cars), and as such may present different "signatures" (e.g., due to varying speeds and Doppler effects), and the noise handling may be configured to take that into consideration. Configuring the noise handling to the exact noise signatures and to acoustic personality may be desirable as it may allow for less power dissipation and less collateral noise (or hiss), such as when tracking active noise sources. In some instances, the noise handling may be configured to provide adjustable treatment—e.g., being configured to cut off noise in different audible levels and/or frequency ranges. Alternatively, some music or other audio may be used to hide the hiss (if present) based on configuration.

In an example implementation, systems providing or applying the intelligent noise management (e.g., the management element 230) may be adapted to the particular "acoustic signature" of a given protected space. Such adaptation may be done as part of the installation process, or it may be done later (after installation, during use of the device). Adapting such systems to the particular "acoustic signature" of the protected space may comprise use and/or generation of well-known audio (patterns), and recording the audio as it is received by the systems (and/or any other sensors) in and/or around the protected space.

Noise cancellation may then be performed. In this regard, noise cancellation may comprise use of a noise equalizer, which may generate a silencing audio—e.g., comprising signals having opposite amplitude in same audio frequencies (e.g., at least where most of the energy resides). For example, noise cancellation may comprise actively creating "opposite" noise at the edge of the domain/space being protected and/or treated, and broadcasting that opposite noise outwards. In that manner, the noise energy that penetrates the protected domain though an opening or through the walls is reduced, thus making the noise cancellation, inside the "protected space," easier. Further, during silencing operations, energy applied to cancel the noise may be directed to the outside, sideways on the openings, and/or internally into the spaces.

In some instances, the noise handling may be done without perfect identification. In this regard, there may not be an acute need for perfect identification, which may take more resource and more prudent analysis and computation. Thus, in some implementations, the noise identification may comprise only identifying and matching a class of noise. Further, as described above, in some instances, noise may be recorded (e.g., when it is encountered for the first time, such as when the source is newly introduced in the vicinity of the protected space), and the recording may be analyzed (locally or remote) to generate data (e.g., matching patterns) that may be used subsequently during the noise handling. Accordingly, registration and/or recording of noise (to be filtered out) may allow for selective filtering of only specific noise (and noise sources), and configuring a measure of adaptability may allow for inclusion of similar or expanded signature of noises that may be changing or about the same to be treated as well.

Alternatively, some acute or common noise source signatures may be stored locally, to allow for immediate action and/or to match the capabilities of the local device/controller, with only the more sophisticated processing being done remotely. For example, in an example use scenario, a cell/smartphone, computer, or other means of communication may be used to communicate locally with a local management system (e.g., the management element, such as to serve as an intermediary between the management element and remote systems/resources, and/or for providing particular functions (e.g., for authentication/authorization purposes) in support of operations of the management element. In some example implementations, devices and/or systems may be adapted and/or configured to enable use of these devices/systems as such intermediaries. For example, an application may be run and/or used (e.g., in a smartphone, tablet, and the like), to enable searching for available local management elements in particular spaces, and/or to couple and/or interact with such elements—e.g., to enable configuring and/or controlling them.

The use of a remote (or local) resource for processing or identifying a noise source may have security and or safety or other advantages. For example, locally limited processing power may prevent more sophisticated analysis. However such an analysis may reveal some security risks to the protected space, enabling action by authorities or personnel to handle such a threat.

In an example implementation, the noise handling may be combined and/or integrated with additional functionality, relating to other considerations (beside noise). For example, in some implementations, the management scheme (and the management element implementing it) may be configured to adaptively incorporate security aspects. Users may be provided, for example, with the ability to configure (e.g., input/output devices) "known sources," allowing identifying, and potentially adaptively treating (e.g., in particularly specified manner) certain sources. For example, adaptive and/or selective treatment of known sources may comprise, for example, amplifying (e.g., to make a selected/suspicious noise source more audible to the dweller or to help hearing impaired) and/or alerting the user from undesired sources or hazardous or safety related vs. blanket cancellation of all noise.

In an example implementation, the management scheme (and the system implementing it, such as the management element 230) may be configured to incorporate adaptive opening (and/or insulation) related control. For example, when an identified noise source (e.g., a morning highway traffic pattern) is identified, and/or is determined to meet a particular criterion or particular criteria (e.g., going above some threshold), an indication or command for some action relating to the opening and/or insulation may be generated and/or sent. Such an action may comprise, for example, sending a message to an integrated and/or external device causing closing of a window or door or directly controlling a device that can take the action or treat the noise. Similarly, when the opening is touched or approached (e.g., determined based on noise of movement or use of instrument close to the opening), or attempt to move the "rod-like" device or interfere with it (physically, electrically, removing its power source, etc.) an indication or command for some action or alert may be generated.

In an example implementation, the management scheme (and the system implementing it, such as the management element 230) may be configured to incorporate, in a similar manner, adaptive lighting related control. For example, increased or decreased lighting internal and/or external to the space (e.g., hotel room) may be utilized as consideration in the management scheme. In this regard, internal/external lighting may be increased or decreased, such as to affect and/or in conjunction with noise cancellation and/or trigger actions. For example, with approaching morning light (which may be, potentially, configured as calendar dependent—e.g., varying based on seasons, such as summer and winter, or particular days, such as holidays and weekend), certain noise cancellation (e.g., highway or traffic, as more traffic would be expected in the morning) may be activated, and/or the opening (window/door) may be automatically closed. As another example, light may be turned on or off and/or directed in the general direction of a noise source or based on other criteria (e.g., some additional info related to the shape of the particular property/room etc.)

In an example implementation, the management scheme (and the system implementing it, such as the management element 230) may be configured to incorporate adaptive air conditioning (A/C) and/or climate related control. For example, the noise handling may be configured to actively filter out A/C noise when turned on (either by management element—e.g., the management element 230—itself, or independently, such as by a user). The A/C filtering may also be configured in adaptive manner—e.g., A/C noise may be filtered to allow positive identification of potential noise sources that could be hidden by the A/C noise (e.g., intruders).

In an example implementation, the management scheme (and the system implementing it, such as the management element 230) may be configured to incorporate adaptive property related control. For example, the management element (e.g., the management element 230) may communicate with and/or be integrated into existing central home control systems/networks, to allow use of (and/or by) these systems/networks. In some implementations, the adaptive management scheme may incorporate alarm related control. For example, the management scheme may be adaptively configured for identification and/or handling of various potential types of security audible sources (preconfigured to be "hunted" for), and/or to take particular actions when such sources are identified (e.g., report any suspect source to existing alarm systems/providers). In other implementations, the management device may be integrated with an external cloud or local computer and activated by a mobile device application.

In some implementations, actions may be taken based on environmental conditions. In an example implementation, an air pollutant sensitive device (local or remote) or an external message may be used to cause local action, such as opening or closing an opening. In another example implementation, a weather sensitive device (local or remote) or an external message may be used to cause local action, such as opening or closing an opening or activating some means of air filtering for example.

The management element 230 (and likewise similar systems used in providing or applying similar management schemes) may be installed and/or mounted on existing infrastructure—e.g., installed on or attached to a window (including incorporating within or in between the window panes in some instances), window frame, door, door frame, curtain holder, etc. Also, as described above, the management element 230 may be simply placed near the opening (and/or comprised of more than one element, for instance an external device to generate some audio for the purpose of reducing the burden on in premise cancellation or for the purpose of creating impression of some activity taking place in or around some premises). The management element 230 may comprise one or multiple sensors and one or more controllers operating in collaboration. Further, the management element 230 may be configured to utilize one or more energy sources, including, for example, typical power sources/connections (e.g., cords connecting to power outlets), as well as additional sources/means—e.g., sunlight, heat, batteries, wireless power to alleviate need for a power cord. For example, the management element 230 may be incorporated into new windows/doors or installed/attached on existing windows/doors. In this regard, with windows, the management element 230 may be configured to use noise/window vibration to match to signatures. Further, the power source in that case may be a battery, power cable, and/or power connector on window frame.

When the management element 230 (and likewise similar systems used in providing or applying similar management schemes) is incorporated into new windows (e.g., between double panes), the management element 230 may benefit from an external solar power unit which may be connected to the management element 230 through tiny holes in the frame, glass or magnetic or wireless attachment. In this regard, solar power may be particularly desirable in some areas (regions enjoying a lot of sunny hours) and/or on locations (buildings or sides thereof) facing the sun long enough to charge. In some instances, the management element 230 may be configured to incorporate and use adaptive and optimized power management—e.g., calculating approximate energy consumption required, and/or identifying and utilizing all possible power sources, including unconventional sources (e.g., use of sound energy or vibration, via MEMS and/or sunlight during the day to at least partially power the device). In some implementations, the device may allocate a computational task to a remote device (which may be authorized, e.g., home computer or cloud based computing) based on local power available. The controller may also issue a warning and send a message or use other means to alert the user, manager, authorized recipient or another device or entity of its power status (including getting to a low level mark) and/or take local action, e.g., close an opening in case power is cutoff, removed or gets below a given threshold.

In an example implementation, the management element 230 (and likewise similar systems used in providing or applying similar management schemes) may use some indication of an authorized user being local (e.g., house owner, hotel guest, office worker) to change a mode of operation, e.g., for noise cancellation, for security for weather control etc.). Such an indication of presence can be provided by detection of a certain device (e.g., a cellphone, RFID or other device) or by receiving an authorized message to that effect.

In an example implementation, the management scheme (and the system implementing it, such as the management element 230) may be configured to provide and/or take advantage of central control of multiple devices, such as over a network or in the cloud. In this regard, the management element (e.g., the management element 230) may be operable to locate and/or communicate with other devices (e.g., within the space associated with the managed opening, and/or external to that space), and to provide central management and control of at least some of these devices. The central management and control may comprise, for example, adapting different devices to different profile(s) of noise "treatment," to create a more favorable/desired outcome. For example, in a space with few devices, the processing and/or noise cancellation (or modification) may be shared, and/or appropriately adapted (for example using the personal acoustic signatures) to create a more favorable outcome. The central management and control may also comprise, for example, focusing some subset of devices on some sources or noise patterns or frequency bands to create a more complete/desired outcome from a group of devices.

In an example implementation, the management element 230 (and likewise similar systems used in providing or applying similar management schemes) may directly perform any required processing (e.g., using processing resources available therein). In some instance, however, the device may use (in addition or in lieu of its processing resources) locally available computing/processing resources (e.g., available in devices that are present on premises) and/or remotely available computing/processing resources (e.g., by remote devices, accessed via a network, and/or in the cloud).

In an example use scenario, the management scheme (and the system implementing it, such as the management element 230) may be configured to adaptively perform the noise handling based on and/or in view of safety and/or security considerations. In this regard, the noise handling (cancellation) may be balanced against and/or adjusted to accommodate occurrence of possible safety/security threats. For example, the management scheme (and the management element implementing it) may be adaptively configured to limit noise neutralization to pre-identified signatures, thus allowing for non-regular noises (which may be related to safety and/or security threats) to be heard. For example, while typical noise (e.g., traffic, etc.) may be cancelled or silenced, other noise, which may comprise such things as audio corresponding to gun shots, explosions, fires, someone attempting to force the door or the window open, would not be dampened, and would still be heard by occupants in the space. In some instances, such sources may be amplified, and/or an action may be taken and/or message may be sent as mentioned above. When a safety or security hazard is identified, a message may be sent also to the authorities (e.g., the police and/or to an entity engaged in property/personnel/ home owner protection and/or to another device such as an authorized cell phone, cloud resident application or computer, etc.). Further, in some instances, users may be provided with the ability to specifically identify or direct the controller with particular sounds/sources (or classes thereof) that would be handled to alert the user (e.g., amplifying such sounds/sources and/or generating alert messages). To that end, recordings/signatures of particular noises may be created and/or designated as high priority (for handling) to enable the management element to pass these sounds through or amplify them.

In another example use scenario, the management scheme (and the system implementing it, such as the management element 230) may be configured to adaptively perform the noise handling based on and/or in view of safety/security considerations as well as climate considerations (e.g., desire for allowing fresh air into the space). In this regard, the noise handling (cancellation) may be balanced against and/or adjusted to accommodate occurrence of possible safety/ security threats as well as desire to take advantage of and/or allow fresh air when possible. For example, the window or other opening may be left open or partially open, to allow ingress of fresh air. The management element may identify growing external noise—e.g., more traffic as the morning approaches or other known noise events are occurring or about to occur (determining that railroad noise is impending, as determined based on known train schedules, or some leading audio pattern(s)). The management element may command another device to open or close a fresh air inlet (the opening, such as window), such as based on determination or detection of scheduled or identified noise source. In case the window/door being forced open, the management element may alert/alarm or force closing of a shutter if one is installed. The force used in closing the shutter can be adjusted to avoid hurting kids/elderly or pets and can be configured based on residents/users of the protected space and/or other criteria.

In an example implementation, the noise handling performed in accordance with the management scheme (as implemented or applied by the management element or coordinated by it or performed in collaboration with other devices) may be configured to enhance safety. For example, noise that reflects (e.g., simulates) some pattern of normal activity may be generated, even when no occupants are present in the protected space. In other words, the management element may "create" noise typical of protected space occupancy, to make some premises look to the outside world as if some activity is taking place. In other instances, such noise generation means may be used even for other purposes (beyond enhancing safety) e.g., to create some desired ambient noise for inside the premises (e.g., white noise, preferred music, etc.). This may be done in the context of the noise handling or treatment described above, or may be done independently.

FIG. 3 is a flow chart that illustrates an example process for applying adaptive management to spaces and/or openings thereof. Shown in FIG. 3 is a flow chart 300, which comprises a plurality of example steps (302-312).

In step 302, a management system/element (or component (s) thereof—e.g., sensors, such as audio detectors, motion detector, etc.) may be applied or installed in space or into opening thereof (directly or nearby).

In step 304, the management system/element may be configured to provide management schemes. The configuring may comprise, for example, setting parameters and/or criteria relating to management schemes to be applied thereby, including noise related parameters, user preferences, space-specific parameters, etc.

In step 306, the management system/elements (or components thereof—e.g., sensors) may monitor for conditions and/or activities (internal and/or external) that are pertinent to management schemes (e.g., noise, safety hazards, environmental conditions, user input, etc.).

In step 308, when a particular condition or activity (or change thereto, if previously detected) occurs, it may be determined whether it needs to be handled (e.g., based on pre-set handling parameters or criteria). If no handling is needed the process may return back to step 306, to continue monitoring; otherwise, the process may proceed to step 310.

In step 310, corresponding handling function(s) may be applied, based on management scheme(s)—e.g., apply noise handling, based on noise alone or in conjunction with non-noise considerations; apply corresponding action (closing, opening, adjusting amount of opening, etc.).

In step 312, feedback or other indicia (e.g., alarm, etc.) may be provided to the user (or others—e.g., authorities, premises owners, etc.). The process may return back to step 306, to continue monitoring.

Figure 4:
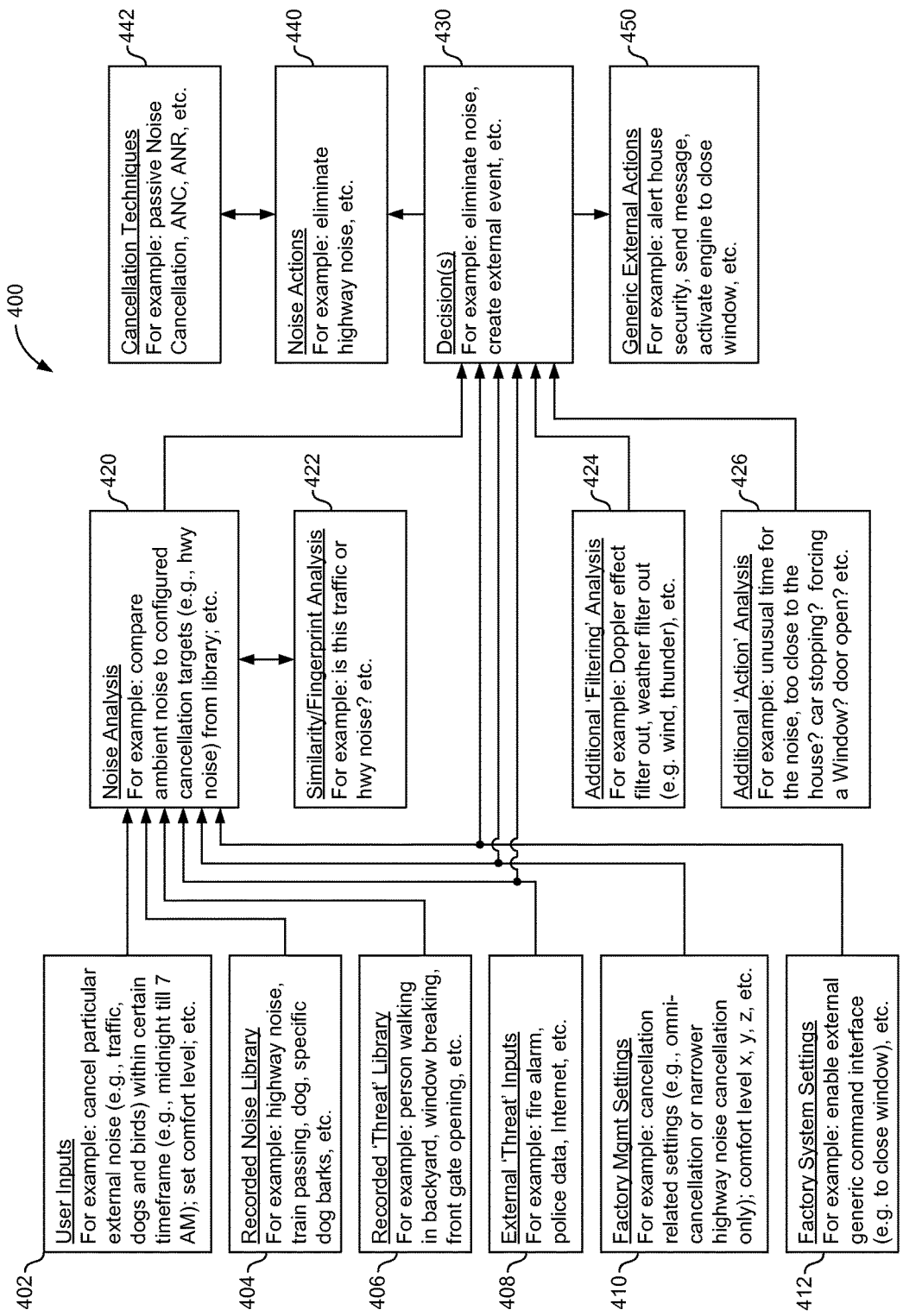
FIG. 4 illustrates an example adaptive noise management scheme.

FIG. 4 illustrates an example adaptive noise management scheme.

Shown in FIG. 4 is a chart 400, representing an example data/function model for implementing an adaptive noise management scheme.

The data/function model 400 may comprise a plurality of example blocks, where each of the blocks may represent a particular set of data and/or functions. In this regard, actions associated with a particular block may be performed based on data associated the same block, data associated with other blocks, and/or actions within that block or within the overall mode. The model 400 may be applied to implement an adaptive noise management scheme. Nonetheless, not all of the example blocks (or data and/or functions corresponding thereto) need to be performed or used. Thus, in certain implementations only particular subset(s) of the plurality of example blocks may be used.

Blocks 402-412 may correspond to actions and/or data (e.g., inputs, preset parameters, etc.) that may be used in configuring, setting up, and/or controlling an adaptive management scheme of intelligent noise treatment (with or without openings management), in accordance with example implementation. In block 402, for example, user inputs may be obtained. In this regard, user input may be used to specify particular criteria and/or conditions, such as noise conditions. For example, user input may specify cancelling particular external noise (e.g., traffic, dogs, and/or birds) or noise class, and/or doing so within certain criteria and/or conditions (e.g., certain timeframe, such as midnight till 7:00 AM); a particular comfort level (e.g., particular temperature, humidity, etc.), and the like. The inputs provided and/or actions taken in these blocks may further be directed to configuring specific action(s) for certain events (e.g., closing a window, treating the noise, sending a message, etc.), and/or for actively generating noise to simulate activity and/or for adding/removing a device from the controller supervision. User inputs may be provided locally (e.g., if allowed) and/or remotely (e.g., if configured and authorized)

In block 404, a recorded noise library and/or particular criteria for audio signatures may be configured. For example, the recorded noise library may specify information regarding various types of noise which may be considered when managing noise and/or openings (e.g., highway noise, train passing, dog, specific dog barks, etc.). In block 406, a recorded threat library and/or particular criteria for audio signatures may be configured. For example, the recorded threat library may specify information regarding various types of threats which may be considered when managing openings (e.g., person walking in backyard, window breaking, front gate opening, etc.). Alternatively such recordings, configuration data, and/or audio signatures may be obtained from remote sources, such as, for example, a local home computer, cell phone (or cell phone application), and/or from authorized remote cloud computation resources/applications.

In block 408, external threat inputs may be obtained. External threat inputs may pertain to conditions that may be relevant to safety considerations when applying the adaptive management scheme. For example, external threat inputs may specify certain events that may be treated as safety threats (e.g., person walking in backyard, window breaking, front gate opening, etc.), or information provided by external systems (authorized to do so) such as a remote applications, cloud based systems, etc.

In blocks 410 and 412, settings may be configured, such as by a system designer and/or manufacturer, such as for use as default parameters in controlling the scheme and/or devices used in implementing and applying the scheme. For example, in block 410, management settings may be set, for use in configuring the management functions, comprising, for example, cancellation related settings (e.g., omni-cancellation or narrower highway noise cancellation only), comfort level related settings, etc. In block 412, system settings may be set, for use in configuring the system implementing the management scheme, comprising, for example, settings for enabling external generic command interface (e.g., to close or open a window), enabling interaction with an intelligent opening management etc.

In block 420, noise analysis may be performed. In this regard, the noise analysis may be based on data and/or information corresponding to the setup and/or input blocks 402-412. The noise analysis may comprise, for example, determining when ambient noise matches any preconfigured noise (e.g., highway noise) which may be targeted for handling (e.g., cancellation). The "specific acoustic signature" of the protected domain may be used in the analysis to adapt the input and/or the analysis to determine the source. Alternatively, the intelligent noise treatment may send the signature of the incoming noise, the recorded incoming noise, identifying parameters of the "specific acoustic signature" or any combination thereof for an external authorized system for analysis. In block 422, more specific analysis may be done, such as when detected ambient noise matches a general category of noise. For example, similarity/fingerprinting analysis may be used to particularly distinguish highway traffic within general traffic noise. In some instances, the processing blocks described herein may be performed locally, remotely, or a combination thereof.

In some instances, additional analysis may be performed, to further enhance and/or tailor the management. For example, in block 424, additional 'filtering' analysis may be performed. In this regard, such filtering analysis may be configured to apply particular filtering techniques and/or for particular filtering targets—e.g., Doppler effect filtering out, weather filtering out (e.g., wind, thunder), etc. In block 426, additional 'action' analysis may be performed. In this regard, such action analysis may be configured to determine when particular actions occur, particularly under certain conditions—e.g., determining whether it was an unusual time for the noise; whether the noise occurred too close to the premises; whether it corresponds to particular actions (e.g., car stopping, forcing a Window, door opening, etc.) and the like. In some instances, the processing blocks described herein may be performed locally, remotely, or a combination thereof. Further, as noted above, in some implementations only a subset may be used.

In block 430, one or more decisions may be taken based on the analysis (blocks) performed in accordance with the management scheme. For example, the decisions may pertain to elimination of noise identified as matching cancellation target(s), and/or to creation of external events in response to matching conditions. In some instances, the processing blocks described herein may be performed locally, remotely, or a combination thereof. In block 440, for example, noise action(s) may be taken, to eliminate particular noise, such as highway noise. Performing the noise action may comprise applying, in block 442, particular noise handling techniques, such as passive noise cancellation, active noise cancellation (ANC), active noise reduction (ANR), etc. The specific method and/or patterns and/or algorithms used to create the cancellation action may be processed locally or remotely or a combination thereof. In block 450, generic external actions may be taken, in response to identified particular conditions. For example, the external actions may comprise alerting home security provider, sending a message, sending a command to another device to cause some action, activating an engine to close window, etc.

The set of local processing and actions may be limited due to configuration, capabilities, size of controller and/or power or other criteria. The controller may have some default capabilities and/or action to be taken in a "stand-alone" mode (as default configuration and/or entered due to an event such as power or communication cut off or concern of some security breach or safety).

Further, with reference to data/action model 400 illustrated in FIG. 4, any subset of each of the blocks shown therein may be aggregated to create a system. Thus, one example implementation may be a rod-like device that may be fitted inside the rails of a window, and may be locally programmed by the user to close the window under particular criteria (e.g., at 5 AM) without any further input. Such implementation may be a low cost simple solution to use and operate a device without any reference to noise cancellation for instance. Nonetheless, if integrated with some computation "brain," such device may be upgraded later locally or remotely (including, e.g., by reprogramming over the Internet) to become a more sophisticated device (e.g., to add nose cancellation functionality, noise metering to detect noise going over some level, take actions under more complex conditions, such as closing the window at particular noise level and/or when light goes over some level, etc.).

Figure 5:
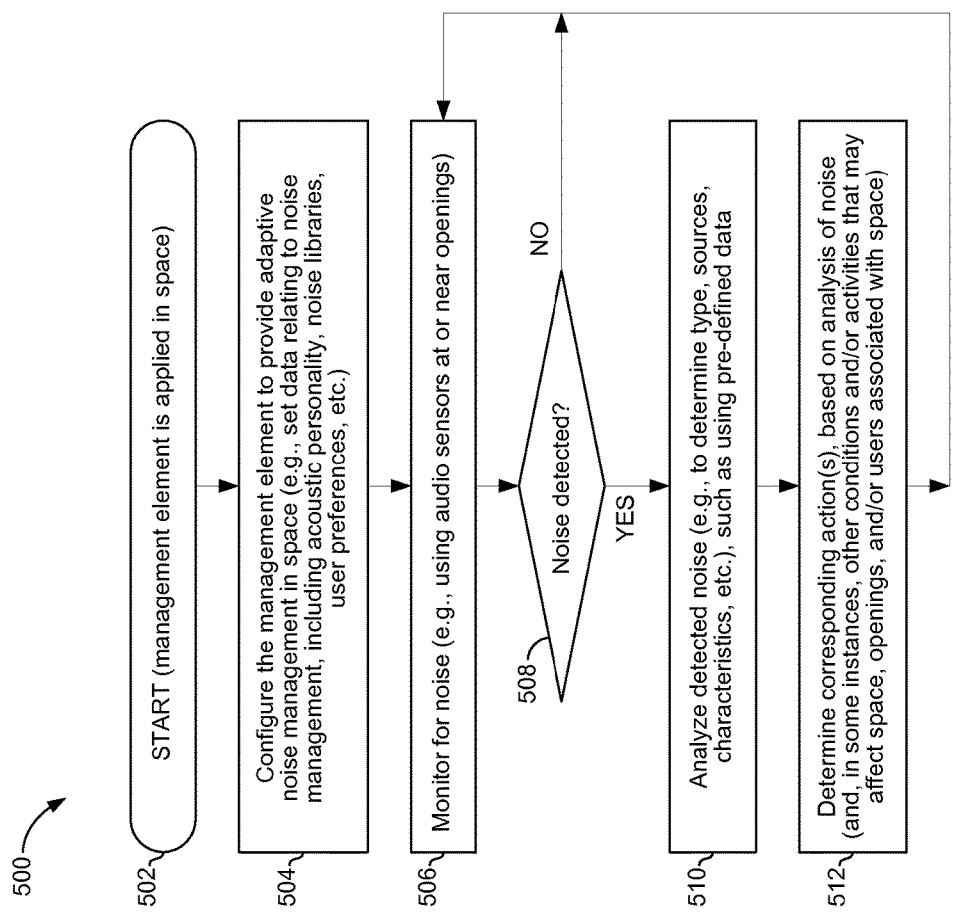
FIG. 5 is a flow chart that illustrates an example process for applying adaptive noise management.

FIG. 5 is a flow chart that illustrates an example process for applying adaptive noise management. Shown in FIG. 5 is a flow chart 500, which comprises a plurality of example steps (502-512).

In step 502, a management system (or component(s) thereof—e.g., sensors, such as audio detectors, motion detectors, etc.) may be applied or installed in space (or into opening thereof, directly or nearby).

In step 504, the management system/element may be configured to provide adaptive noise management in the space. The configuring may comprise, for example, setting data (e.g., parameters, criteria, etc.) relating to noise management. This may include determining (and storing information relating to) acoustic personality of the space, defining noise libraries that may be used in noise identification, setting user preferences relating to noise (identification thereof, preferred acoustic environment, preferred remedial actions, etc.), and the like.

In step 506, the management system/elements (or components thereof—e.g., sensors) may monitor for noise. This monitoring may also include monitoring for other, non-noise related conditions and/or activities that may affect the space (e.g., safety hazards, environmental conditions, user input, etc.).

In step 508, it may be determined whether noise is detected. If no noise is detected, the process may return back to step 506, to continue monitoring; otherwise, the process may proceed to step 510.

In step 510, detected noise may be analyzed (e.g., to determine type, sources, characteristics, etc.), such as by using pre-defined data.

In step 512, corresponding action(s) may be determined, based on analysis of the detected noise. Further, in some instances, other conditions and/or activities which may also affect the space, openings thereof, and/or users associated with space may be considered in determining the corresponding action(s) (and/or in determining whether or not to proceed with determined action). The determination of the actions may be based on pre-defined data, user (real-time) input, etc.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for using adaptive noise management.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed:

1. A method, comprising
providing, via an electronic device, adaptive noise management in a space, said adaptive noise management comprising, at least:
determining acoustic characteristics of said space;
detecting when noise is present in said space;
analyzing said detected noise, wherein said analysis is based on said determined acoustic characteristics of said space;
taking one or more actions in response to said detected noise, based on said analysis of said detected noise.

2. The method of claim 1, wherein analyzing said detected noise comprises one or more of:
determining source of said detected noise;
determining type of said detected noise; and
determining characteristics of said detected noise.

3. The method of claim 1, comprising analyzing one or more non-noise conditions and/or activities associated with said space when analyzing said detected noise and/or when determining said one or more actions.

4. The method of claim 1, wherein said one or more actions comprise applying noise cancellation to mitigate, reduce, or eliminate effects of said detected noise.

5. The method of claim 1, wherein said one or more actions comprise adjusting one or more openings in said space.

6. The method of claim 1, comprising applying or configuring at least one step corresponding to said adaptive noise management based on real-time sensory data pertaining to one or more of: said space, one or more openings of said space, said detected noise, conditions associated with said space, and activities affecting said space.

7. The method of claim 1, comprising applying or configuring at least one step corresponding to said adaptive noise management based on pre-set data, parameters, and/or criteria associated with one or more of: said space, one or more openings of said space, said detected noise, said conditions, and said activities.

8. The method of claim 1, comprising applying or configuring at least one step corresponding to said adaptive noise management based on user input.

9. The method of claim 1, comprising concurrently applying said adaptive noise management when said detected noise comprises a plurality of noise signals, said concurrent application of said adaptive noise management to said plurality of noise signals comprising:

separately analyzing each one of said plurality noise signals; and determining at least one action that is specific to at least one of said plurality of noise signals based on said analyzing of said one of said plurality of noise signals.

10. A system, comprising an electronic device configured for providing adaptive noise management in a space, wherein said electronic device is operable to, when providing said adaptive noise management:

determine acoustic characteristics of said space;

detect when noise is present in said space;

analyze said detected noise, wherein said analysis is based on said determined acoustic characteristics of said space; and take one or more actions in response to said detected noise, based on said analysis of said detected noise.

11. The system of claim 10, wherein analyzing said detected noise comprises one or more of:

determining source of said detected noise;

determining type of said detected noise; and determining characteristics of said detected noise.

12. The system of claim 10, wherein said electronic device is operable to analyze one or more non-noise conditions and/or activities associated with said space when analyzing said detected noise and/or when determining said one or more actions.

13. The system of claim 10, wherein said one or more actions comprise applying noise cancellation to mitigate, reduce, or eliminate effects of said detected noise.

14. The system of claim 10, wherein said one or more actions comprise adjusting one or more openings in said space.

15. The system of claim 10, wherein said electronic device is operable to apply or configure at least one step corresponding to said adaptive noise management based on real-time sensory data pertaining to one or more of: said space, one or more openings of said space, said detected noise, conditions associated with said space, and activities affecting said space.

16. The system of claim 10, wherein said electronic device is operable to apply or configure at least one step corresponding to said adaptive noise management based on pre-set data, parameters, and/or criteria associated with one or more of: said space, one or more openings of said space, said detected noise, said conditions, and said activities.

17. The system of claim 10, wherein said electronic device is operable to apply or configure at least one step corresponding to said adaptive noise management based on user input.

18. The system of claim 10, wherein said electronic device is operable to concurrently apply said adaptive noise management when said detected noise comprises a plurality of noise signals, said concurrent application of said adaptive noise management to said plurality of noise signals comprising:

separately analyzing each one of said plurality noise signals; and determining at least one action that is specific to at least one of said plurality of noise signals based on said analyzing of said one of said plurality of noise signals.

\* \* \* \* \*